United States Patent [19]
Sbaschnigg

[11] Patent Number: 4,885,088
[45] Date of Patent: Dec. 5, 1989

[54] FILTER BELT PRESS

[75] Inventor: Johann Sbaschnigg, Graz, Austria

[73] Assignee: Maschinenfabrik Andritz Actiengesellschaft, Graz, Austria

[21] Appl. No.: 944,388

[22] Filed: Dec. 18, 1986

[30] Foreign Application Priority Data

Dec. 19, 1985 [AT] Austria ............................. A3677/85

[51] Int. Cl.⁴ ............................................... B01D 33/04

[52] U.S. Cl. .................................... 210/400; 162/300; 162/301; 100/120

[58] Field of Search ............... 210/224, 400, 401, 386; 100/117, 152, 153, 154, 118, 119, 120; 162/358, 360.1, 301, 303, 300, 352, 348

[56] References Cited

U.S. PATENT DOCUMENTS

| | | | |
|---|---|---|---|
| 1,958,279 | 5/1934 | Morgan | 210/401 |
| 2,382,453 | 8/1945 | Thompson | 210/401 |
| 3,587,451 | 6/1971 | Luthi | 210/386 |
| 3,796,149 | 3/1974 | Heissenberger | 100/118 |
| 3,847,731 | 11/1974 | Arledter | 162/301 |
| 3,929,065 | 12/1975 | Csordas et al | 100/154 |
| 4,147,101 | 4/1979 | Heissenberger et al. | 100/118 |
| 4,181,616 | 1/1980 | Bahr | 210/386 |
| 4,266,474 | 5/1981 | Bähr | 210/401 |
| 4,297,215 | 10/1981 | Altmeyer et al. | 210/401 |
| 4,544,447 | 10/1985 | Pinter et al. | 210/401 |
| 4,623,429 | 11/1986 | Tissari | 162/301 |
| 4,647,417 | 3/1987 | Bottger et al. | 100/154 |

FOREIGN PATENT DOCUMENTS

| | | | |
|---|---|---|---|
| 643772 | 6/1962 | Canada | 100/118 |
| 3404422 | 10/1984 | Fed. Rep. of Germany | 100/118 |
| 119496 | 7/1983 | Japan | 100/118 |

*Primary Examiner*—W. Gary Jones
*Assistant Examiner*—Matthew O. Savage
*Attorney, Agent, or Firm*—Townsend and Townsend

[57] ABSTRACT

The invention relates to a filter belt press for separating solid matter from material suspensions, in particular fibrous material suspensions, in which the filter belts are guided through a wedge-shaped dehydrating zone in which the filter belts are supported at least over portions by wedge-like converging filter plates. For an optimation of the pressing effect, it is provided that the filter belts (3,4) be guided from this first dehydrating zone (1), in which the filter plates (5) are optionally supported by dehydrating boxes (6) or provided with dehydrating boxes (6) on their outsides, into a surface press (2) or surface pressure means for the material (29) or filter cake present between the filter belts (3,4), the press (2) in particular being immediately adjacent the end of the wedge-shaped dehydrating zone (1).

54 Claims, 5 Drawing Sheets

FILTER BELT PRESS

BACKGROUND OF THE INVENTION

The invention relates to a filter belt press for separating solid matter from material suspensions, in particular fibrous material suspensions, in which the filter belts are guided through a wedge-shaped dehydrating zone into a, particularly immediately adjacent, further dehydrating zone.

The filter belts enter the dehydrating zone at the largest area at the wedge-shape and exit the zone at the narrowest area of the wedge-shape.

SUMMARY OF THE INVENTION

Filter belt presses of this type are used in particular for pressing material suspensions containing mainly fibrous material to a state of the highest possible solids content. In order to achieve the highest possible solids content in the shortest possible time, a filter belt press of the type initially mentioned is characterized in that the filter belts are supported in the wedge-shaped dehydration zone at least over portions by wedge-like converging filter plates optionally supported by dehydrating boxes or provided with dehydration boxes on their outsides and that the dehydration zone adjacent the wedge-shaped dehydration zone comprises a surface press or a surface pressure means for the material or the filter cake present between the filter belts. By converging, it is meant that the filter plates come closer together as they near the narrowest area of the wedge-shaped dehydration zone.

The material suspension is thus subjected to a first dehydrating step in a first dehydrating means, namely, in a dehydrating zone formed of wedge-like converging filter plates. Directly from the end of the dehydrating wedge, the filter belts are guided into surface pressure means whose purpose it is to achieve the highest possible solids content by further, in particular continuous pressing of the filter cake, with the possibility to adjust the surface pressure means to the requirements of the dehydrating wedge so that filter cakes of various thickness and consistency can be pressed without reinforcing the wedge one. Instead of the conventional table rolls, filter plates which may be supported by dehydration boxes and are provided with a plastic material layer for the filter belts are provided in the wedge zone. The defined dehydration in the wedge zone results in a consistency of the filter cake which is well suited for treatment in the surface press. The immediately following surface pressing of the material without intermediate rearrangement allows for a pressing of the material which cannot be achieved by means of a press which is disposed downstream of the filter belt press in a conventional manner.

A preferred embodiment of the invention is characterized in that the surface pressure means is a pivotally or movably supported dehydrating box applicable by a contact pressure means, optionally with adjustable surface pressure, against one of the filter belts, preferably the upper filter belt, which dehydrating box is provided with a perforated plate or filter plate disposable abuttingly against the filter belt. A dehydrating box suitable for contact pressure can be used for surface pressure variable in respect of pressure and thickness of the press nip by means of which the material already partly dehydrated or prepressed in the filter nip of the preceding pressing zone can be optimally treated further.

Another preferred embodiment of the invention is characterized in that the surface pressure means is provided in the form of a dehydrating shoe applicable by a contact pressure means, preferably with adjustable surface pressure against one of the filter belts, preferably the upper filter belt, movably, pivotally and settably disposed and provided with a pressing surface optionally provided with drainage holes over which the filter belts are guided. By guiding the filter belts along the curvature of the dehydrating shoe or pivoting or setting of the onesidedly supported dehydrating shoe, the two filter belts and the material present therebetween are more or less strongly pressed.

An alternative to a pivotal dehydrating shoe is provided according to the invention in that the surface pressure means is provided in the form of a stationary dehydrating shoe having a pressing surface optionally provided with drainage holes over which the filter belts are guided. In this, the requirements of the material can be met in the dehydration following the filter wedge by adjusting the curvature or exchanging the dehydrating shoe by a dehydrating shoe of different curvature. It is preferred, however, that the dehydrating shoe or its pressing surface be curved, with the optionally adjustable curvature disposed on the outlet side area of the dehydrating shoe or extending over at least an essential portion of its length.

Further embodiments of the invention provide that the surface pressure means be formed by at least one roller or pair of rollers passed by the filter belts and loaded by a contact pressure means with adjustable surface pressure, around which roller or through which rollers the filter belts are guided, or that the surface pressure means is formed by an S-shaped arrangement of rollers adjustable in respect of their mutual positions by contact pressure means, over which rollers the filter belts are guided. By the rollers acting on the filter belts with adjustable pressure, the roller nip or the rollers disposed in staggered S-shape, an adjustment of the appropriate surface pressure will also result in an optimal post-dehydration of the material conveyed between the filter belts.

For the embodiments of the filter belt presses according to the invention mentioned previously, but also for other purposes of sealing filter belts completely independent thereof, the lateral sealing of the filter belts, in particular within the area of the surface pressure means, can be provided in the form of a sealing means, for instance a sealing strip or a sealing wedge, along the edge of each filter belt and applicable by pressure against the marginal zone of at least one filter belt, preferably the lower filter belt. For forming a tapering nip between the upper and the lower filter belts, the sealing means is formed by a sealing strip pivotally supported by its inner end and whose outer end is adjustable in height by an adjusting means or is formed by a sealing wedge having an abutting surface inclined from the inside to the outside, which sealing wedge is applicable by pressure against the outside of the filter belt by an adjusting means. It is convenient to provide for the adjusting means to be formed by an inflatable tube disposed underneath the outer end zone of the sealing strip preferably in a groove in the marginal area of the filter plate and extending in the longitudinal direction of the filter belts, by means of which tube the outer end of the sealing strip is pivotal and applicable by pressure against the marginal area of the lower filter belt. It is also convenient if the sealing wedge pressing the marginal area of the lower filter belt upwards is provided with a mechanical or hydraulic or pneumatic height adjusting means by which its contact pressure is adjustable.

Particularly if this type of lateral sealing is combined with a surface pressure means having a dehydrating box pressing the filter belts against a filter plate, the good support of the one filter belt results in an optimal sealing against a lateral escape of the material suspension; this also applies to the wedge zone in which the filter belts are guided between filter plates forming a flat (plane) supporting surface for the filter belts. Particularly in the area of a mobile dehydrating box applicable by pressure, this particular type of seal is of advantage due to the lack of overall height. If the filter belts are pressed against each other by means of a flexibly attached sealing strip and an air tube of adjustable pressure, the sealing is achieved in a manner virtually free of wear for the filter belts.

In a preferred embodiment of the invention, the two filter belts with the material present therebetween are additionally guided over at least one pair of rollers arranged downstream of the surface pressure means.

The invention is explained in the following under reference to the drawings.

DETAILED DESCRIPTION OF THE PREFERRED EMBODIMENTS

Figure 1:
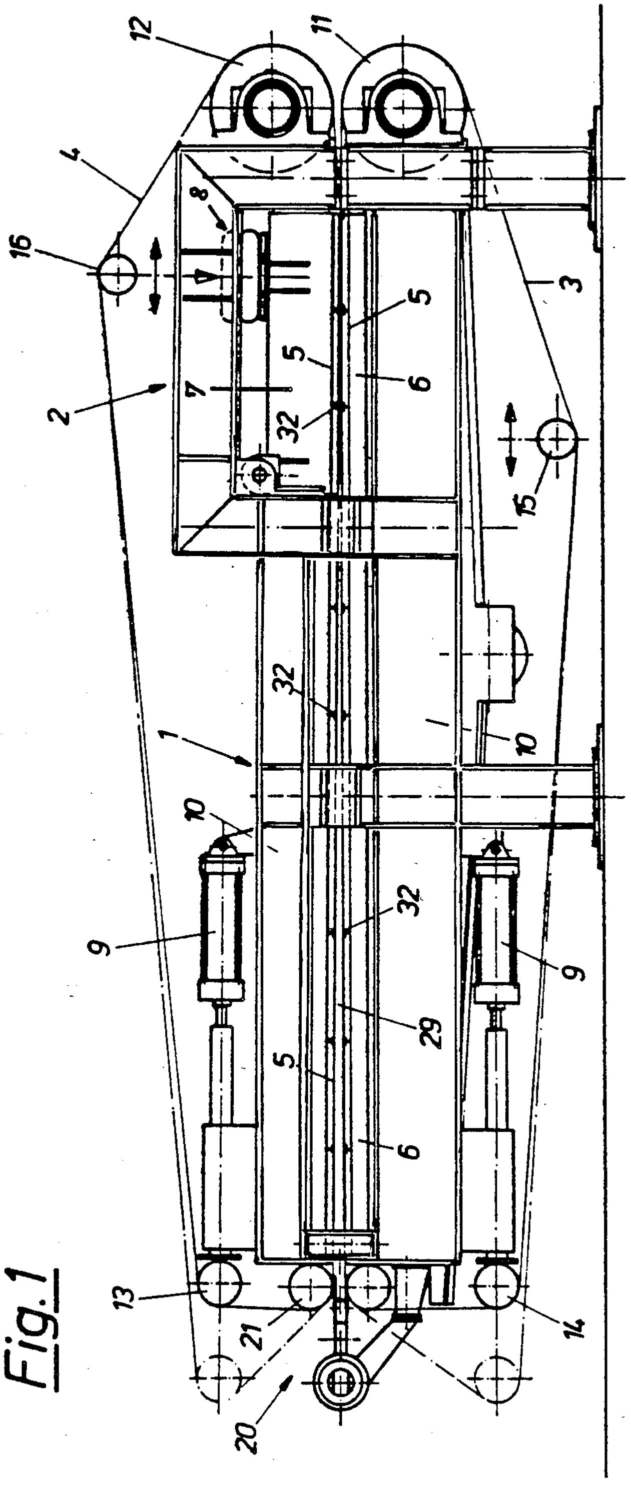
FIGS. 1 to 3 show filter belt presses with various surface pressure means arranged downstream of a stationary, wedge-shaped dehydrating zone.
Figure 5:
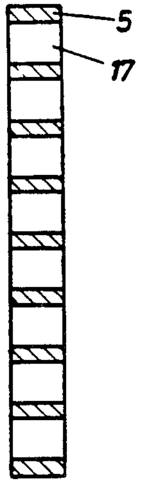
FIGS. 4 and 5 are views of filter plates of the dehydrating wedge.
Figure 4:
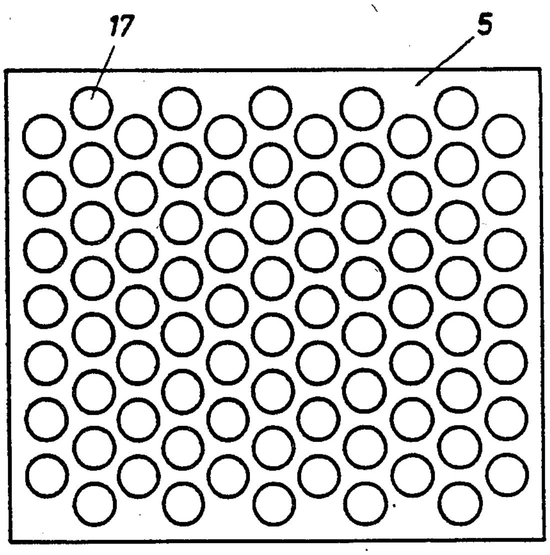
Figure 6:
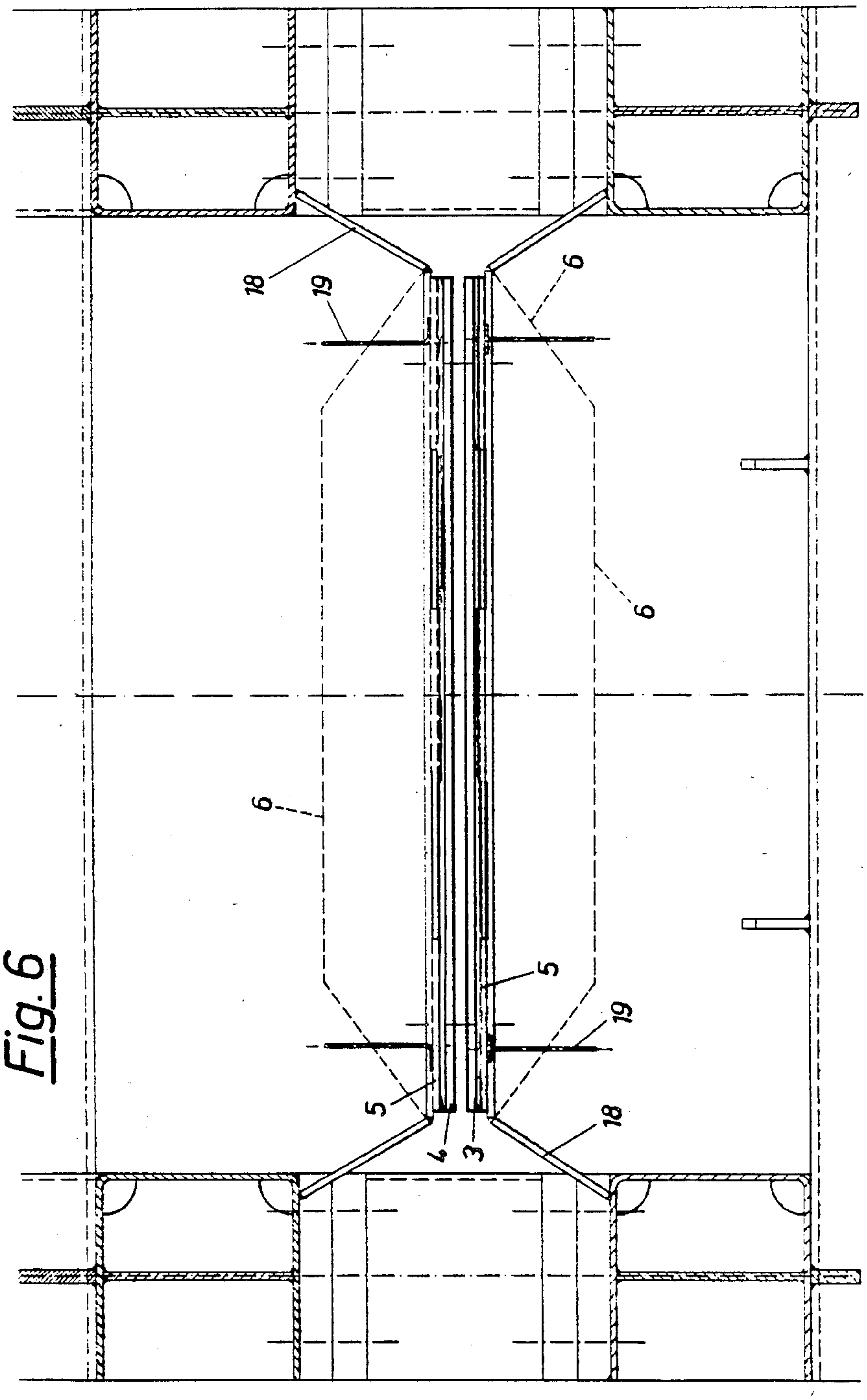
FIG. 6 is a sectional view of a dehydrating wedge along line A-A in FIG. 1.

FIG. 1 schematically shows a filter belt press in which two filter belts 3, 4 are guided circulating over rollers 11, 12, 13, 14, 15, 16, 21 and 22. For the dehydration of a material, in particular a material suspension, introduced at 20 by a charging means (not shown) between the filter belts 3, 4, the filter belts 3, 4 are guided in the form of a nip narrowing from the nip inlet on. As FIG. 6 shows in sectional view, the narrowing nip is formed by filter plates 5 over which the filter belts 3, 4 are guided and with which dehydrating boxes 6 may be associated. The filter plates with openings 17 are supported by supports 18 or supporting means 19 fixed to the press frame or the beams 10 which carry, for instance, welded T-profiles 32 (FIG. 1) engaging lateral grooves of the filter plates 5. The filter plates may be inserted laterally and fixed by means of screws. The filter plates 5 are shown in detail in FIGS. 4 and 5, with the arrangement of the holes 17 shown in FIG. 4 and FIG. 5 representing a cross section according to FIG. 4. The dehydrating boxes 6 are supported, for instance, by the beams 10. Since the filter plates are fixed in their positions by the dehydrating boxes 6 and/or the supports 18 and/or the supporting means 19 or the T-profiles 32, a lateral yielding of the filter belts 3, 4 is not possible and excellent dehydration is achieved as compared to a guiding of the filter belts 3, 4 in the dehydrating wedge by means of table rollers.

Immediately adjacent the dehydrating wedge, the filter belts 3,4 are guided through a surface pressure means 2 for the filter cake. According to FIG. 1, the surface pressure means 2 comprises a dehydrating box 7 pivotally supported on its end facing the dehydrating wedge. The other end of the dehydrating box 7 is adjustable in height by an hydraulic or mechanical contact pressure means 8. That side of the dehydrating box 7 facing the filter belt 4 is formed with a filter plate 5 in order to be able to discharge filtrate. The lower filter belt 3 is also supported by a filter plate 5 which is, for instance, carried or supported by a stationary dehydrating box 6. The filter plates 5 could also be attached to the dehydrating box 7 or the filter plates 5 supporting the lower filter belt 3 could be held by T-profiles 32 engaging lateral grooves of the filter plates 5. In this way, an adjustable surface pressure can be exerted on the material present between the filter belts 3, 4 and the preceding dehydration can be optimally continued in the filter wedge.

Figure 2:
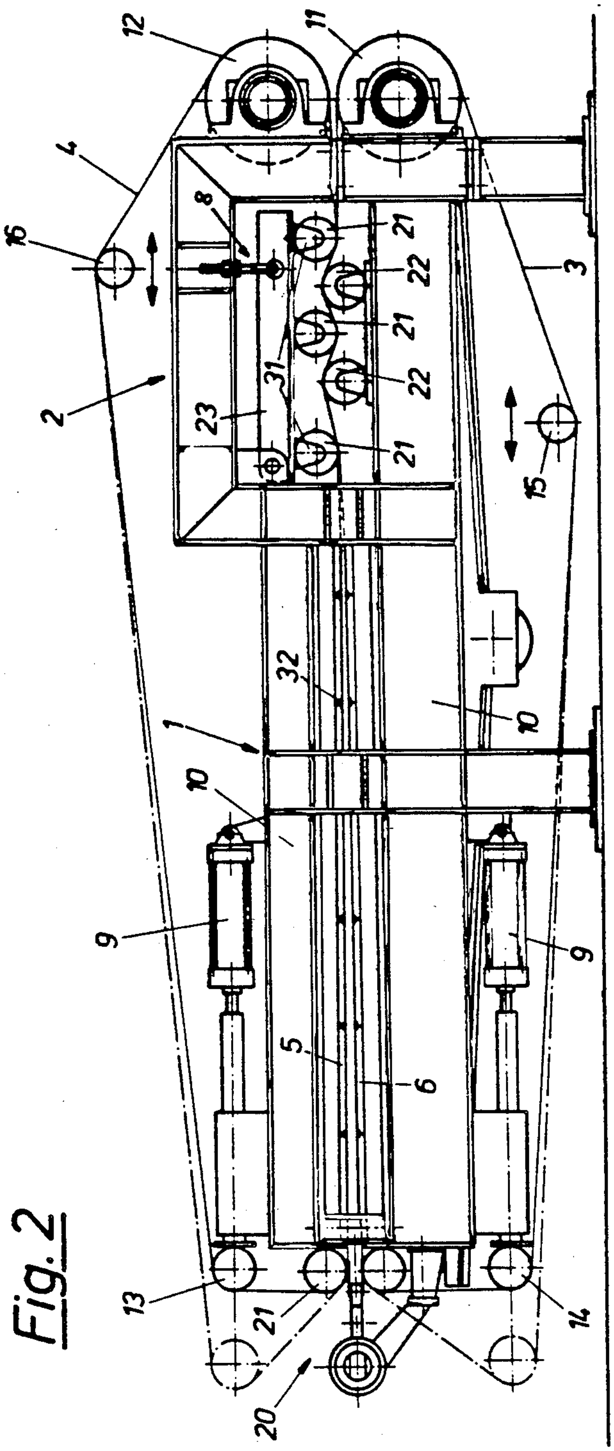

FIG. 2 shows a filter belt press essentially corresponding in its configuration to the filter belt press represented in FIG. 1. The dehydrating wedge, however, is followed, instead of by a pivotal dehydrating box 7, by an arrangement of preferably essentially horizontally positioned rollers 21. As indicated schematically, the rollers 21 are adjustable in height with their support 31 on a carrying device 23. The carrying device 23 is pivotally supported for this purpose in the machine frame on its end facing the filter wedge and its other end is adjustable in height by an hydraulic or mechanical pressure means 8. Between rollers 21 placed side by side project rollers 22 so that there is an S-shaped course of the filter belts 3, 4 between the rollers 21 and 22 adjustable in relation to one another. The surface pressure is changeable by actuaton of the hydraulic means 8. The rollers 22 can be formed adjustable or stationary.

On principle, it is also possible to provide a pair of rollers with opposing rollers forming a roller nip with adjustable pressure.

Figure 3:
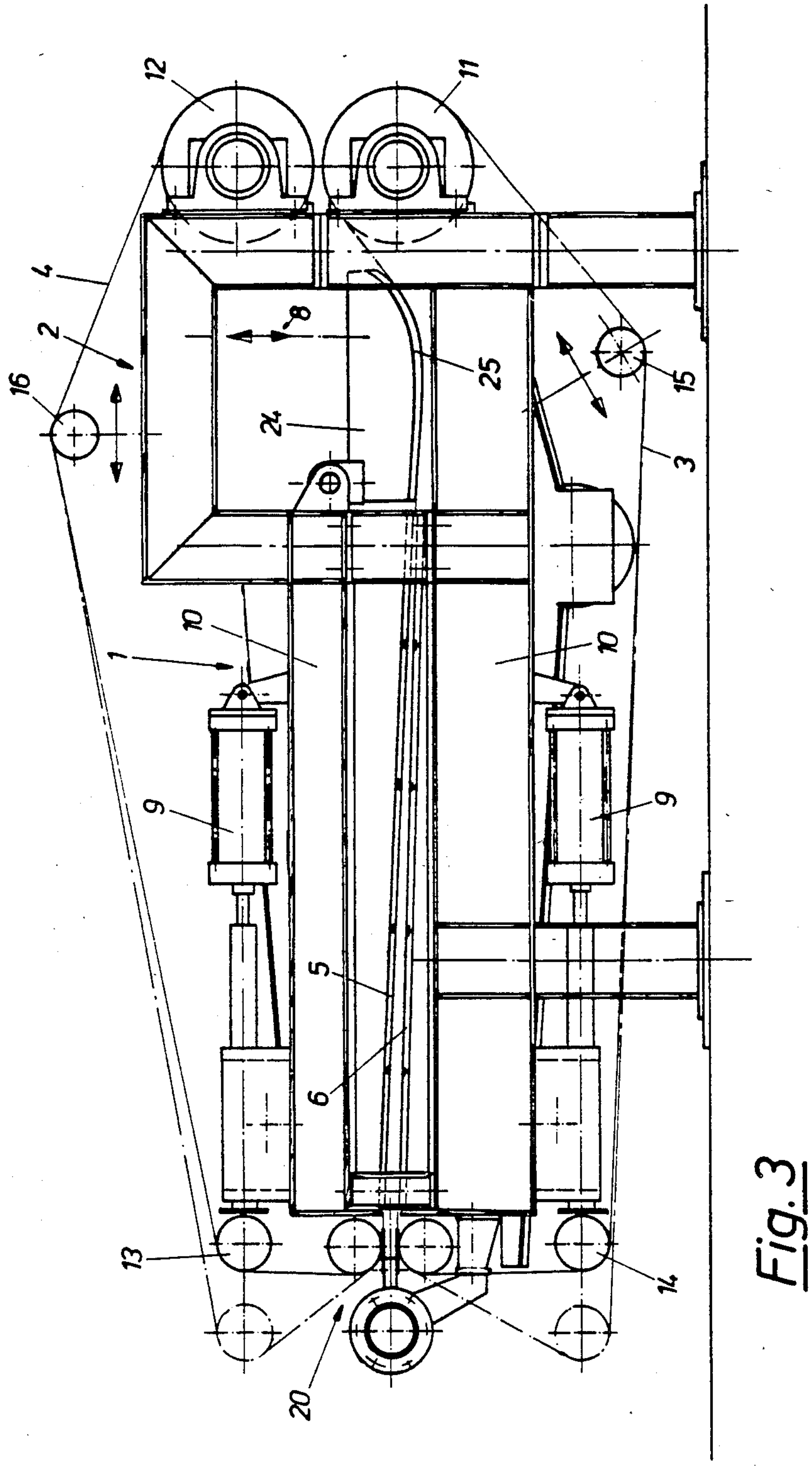

FIG. 3 shows a filter belt press which again essentially corresponds to the filter belt press represented in FIG. 1. Adjacent the dehydrating wedge, a dehydrating shoe 24 is pivotally disposed on the filter belt press frame on its end facing the dehydrating wedge. The dehydrating shoe 24 is provided with a curved portion 25 arranged in the area of the end facing away from the filter wedge. This area is subjected to the action of an hydraulic pressure or adjusting means 8 in order to be able to pivot the dehydrating shoe 24. Depending on the adjustment of the dehydrating shoe 24, the filter belts 3, 4 passing over the curved face 25 of the dehydrating shoe 24 are more or less compressed.

If a stationary dehydrating shoe 24 is provided, whose curvature 25 provides the surface pressure for the material present between the filter belts 3, 4 actuation of hydraulic cylinders 9 and the resulting displacement of the rollers 13, 14 over which the filter belts 3, 4 circulate can achieve the setting of a higher tension of the filter belts 3, 4 and thus of the pressure of the dehydrating shoe 24 or its curved surface 25 on the material to be dehydrated.

It is essential that the filter belts 3,4 pass between the dehydrating shoe and the surface pressure means without essential bending.

Figure 7:
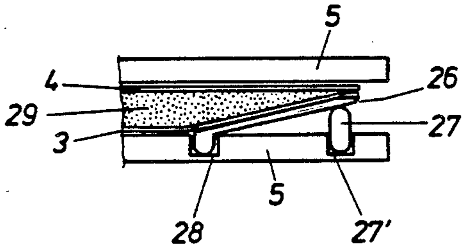
FIGS. 7 and 8 show various sealing devices for the filter belts.

FIG. 7 shows a sealing means which might be provided particularly in the surface pressure means. In the lower filter plates 5 or —if no filter plates 5 are provided— in the lower carrying or supporting surface for the filter belts, in particular a marginal flange supporting the filter belts, a recess 28 in which a sealing strip 26 is pivotally disposed is formed. The free end of the strip 26 is adjustable in height by an actuating means, in the present case an inflatable tube 27 supported in a recess 27', in order to make the lower filter belt 3 abut the upper filter belt 4. This results in a lateral closing or sealing of the filter belts 3, 4 so that the material 29 present between the filter belts cannot escape. Instead of an inflatable tube 27, it would also be possible to provide a sliding means adjustable in height which can force the strip 26 upwards. The positioning of the strip 26 in the recess 28 or on the filter plate 5 can also be effected differently. It is essential that a tapering nip be formed in the marginal area of the filter belts 3, 4 and that the ends of the nip be sealingly closed. By the use of an inflatable tube 27, a more or less high pressure of the lower filter belt 3 against the upper filter belt 4 can be obtained and the sealing arrangement can be adjusted to existing requirements.

Figure 8:
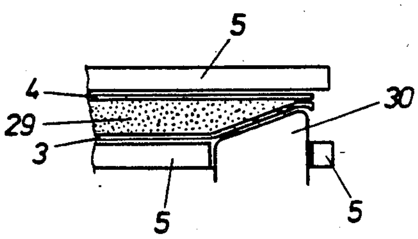

The sealing strip 26 can be replaced by a sealing wedge 30 adjustable in height having a surface obliquely rising from the inside to the outside along which the filter belt 3 is guided, as shown in FIG. 8.

In principle, it is possible to let the arrangement according to FIGS. 7 and 8 also act on the upper filter belt or to let arrangements of this type act on both filter belts 3, 4 simultaneously.

What is claimed is:

1. A filter belt press for separating solid matter from material suspensions, comprising:

an upper roller-guided filter belt including a substantially horizontally arranged part;

a lower roller-guided filter belt including a substantially horizontally arranged part;

means for moving the upper and lower filter belts in a chosen direction;

the substantially horizontally arranged part of the upper filter belt and the substantially horizontally arranged part of the lower filter belt defining therebetween a wedge-shaped space converging in a moving direction of the belts, a widest portion of the wedge-shaped space being adjacent a material-introducing side of the press, and a narrowest portion of the wedge-shaped space being adjacent a material-exiting side of the press;

an upper filter plate arranged above the upper belt, for guiding and supporting the upper belt over at least a portion of the substantially horizontally arranged part of the upper belt;

a lower filter plate arranged below the lower belt, for guiding and supporting the lower belt over at least a portion of the substantially horizontally arranged part of the lower belt;

a first dehydrating zone, including the upper filter belt, the lower filter belt, the wedge-shaped space, the upper filter plate and the lower filter plate, the first dehydrating zone defining a horizontal plane;

a second dehydrating zone, disposed in the moving direction immediately following the first dehydrating zone on substantially the same horizontal plane, including:

a dehydrating shoe having:

a head proximate the material-introducing side of the press at an end of the narrowest portion of the wedge-shaped space;

a pressing surface including a convexly curved surface section disposed proximate the material-exiting side of the press, facing and guiding together the upper and lower filter belts;

a shoe end adjacent the material-exiting side of the press;

a pivotal adjustable support for supporting the shoe;

pressure adjusting means for pressing the convexly curved surface section of the dehydrating shoe against the upper and lower filter belts; and means for applying and varying a force between the pressing surface and the upper and lower filter belts;

whereby the pressing surface is situated on substantially a common level with the material-exiting side of the press and includes means for producing a continuously rising force against exiting material present between the upper and lower filter belts.

2. A filter belt press according to claim 1, wherein the pressure adjusting means presses the dehydrating shoe against the upper filter belt.

3. A filter belt press according to claim 1, wherein the dehydrating shoe includes a pressure surface defining drainage holes over which the upper and lower filter belts are together guided.

4. A filter press according to claim 1, wherein the curved surface section extends over at least a substantial portion of the pressing surface of the dehydrating shoe.

5. A filter belt press for separating solid matter from material suspensions, comprising:

an upper roller-guided filter belt including a substantially horizontally arranged part;

a lower roller-guided filter belt including a substantially horizontally arranged part;

means for moving the upper and lower filter belts in a chosen direction;

the substantially horizontally arranged part of the upper filter belt and the substantially horizontally arranged part of the lower filter belt defining therebetween a wedge-shaped space converging in a moving direction of the belts, a widest portion of the wedge-shaped space being adjacent a material-introducing side of the press, and a narrowest portion of the wedge-shaped space being adjacent a material-exiting side of the press;

an upper filter plate arranged above the upper belt, for guiding and supporting the upper belt over at least a portion of the substantially horizontally arranged part of the upper belt;

a lower filter plate arranged below the lower belt, for guiding and supporting the lower belt over at least a portion of the substantially horizontally arranged part of the lower belt;

a first dehydrating zone, including the upper filter belt, the lower filter belt, the wedge-shaped space, the upper filter plate and the lower filter plate, the first dehydrating zone defining a horizontal plane;

a second dehydrating zone, disposed in the moving direction immediately following the first dehydrating zone on substantially the same horizontal plane, including:

a dehydrating shoe having:

a head proximate the material-introducing side of the press at an end of the narrowest portion of the wedge-shaped space;

a pressing surface including a convexly curved surface section proximate the material-exiting side of the press, facing and guiding together the upper and lower filter belts;

a shoe end adjacent the material-exiting side of the press;

a pivotal adjustable support for supporting the shoe;

pressure adjusting means for pressing the convexly curved surface section of the dehydrating shoe against a chosen one of the upper and lower filter belts; and means for applying and varying a force between the pressing surface and the upper and lower filter belts;

whereby the pressing surface is situated on substantially a common level with the material-exiting side of the press and includes means for producing a continuously rising force against exiting material present between the upper and lower filter belts;

means for laterally sealing the upper and lower filter belts, extending along edges of the upper and lower filter belts and defining a marginal zone at contact points with the edges, said means for laterally sealing including:

an elongated sealing strip having an inner end and an outer end; and a pivotal support for pivotally mounting the inner end of the elongated sealing strip to the press;

means for applying variable pressure to the means for laterally sealing at the marginal zone;

the means for applying variable pressure adjusting a height of the outer end of the elongated sealing strip, and the marginal zone of the lower filter belt and the marginal zone of the upper filter belt are pressed against each other, forming a tapering nip between the filter belts.

6. A filter press according to claim 5, wherein the means for applying variable pressure includes an inflatable tube, disposed beneath the outer end of the sealing strip, for pivoting the outer end of the sealing strip upon inflation, thereby varying the pressure exerted.

7. A filter press according to claim 5, wherein a chosen one of the upper and lower filter plates includes a surface defining a groove in a lateral direction, the surface facing away from the chosen filter belt;

the inflatable tube being disposed in the groove.

8. A filter belt press for separating solid matter from material suspensions, comprising:

an upper filter belt including a substantially horizontally arranged part;

a lower filter belt including a substantially horizontally arranged part;

rollers for guiding the upper and lower filter belt;

means for moving the upper and lower filter belts in a chosen direction;

the substantially horizontally arranged part of the upper filter belt and the substantially horizontally arranged part of the lower filter belt defining therebetween a wedge-shaped space converging in a moving direction of the belts, a widest portion of the wedge-shaped space being adjacent a material-introducing side of the press, and a narrowest portion of the wedge-shaped space being adjacent a material-exiting side of the press;

an upper filter plate arranged above the upper belt, for guiding and supporting the upper belt over at least a portion of the substantially horizontally arranged part of the upper belt;

a lower filter plate arranged below the lower belt, for guiding and supporting the lower belt over at least a portion of the substantially horizontally arranged part of the lower belt;

a first dehydrating zone, including the upper filter belt, the lower filter belt, the wedge-shaped space, the upper filter plate and the lower filter plate, the first dehydrating zone defining a horizontal plane;

a second dehydrating zone, disposed in the moving direction immediately following the first dehydrating zone on substantially the same horizontal plane, including:

a dehydrating shoe having:

a head proximate the material-introducing side of the press at an end of the narrowest portion of the wedge-shaped space;

a pressing surface including a convexly curved surface section disposed proximate the material-exiting side of the press, facing and guiding together the upper and lower filter belts;

a shoe end adjacent the material-exiting side of the press; and means for variably displacing the guiding rollers for the upper and lower belt, varying thereby the tension in the upper and lower filter belts;

whereby the pressing surface is situated on substantially a common level with the material-exiting side of the press and includes means for producing a continuously rising force against exiting material present between the upper and lower filter belts.

9. A filter press according to claim 8, wherein the means for variably displacing presses the curved surface section simultaneously against the upper and the lower filter belts.

10. A filter press according to claim 8, wherein the means for variably displacing presses the dehydrating shoe against the upper filter belt.

11. A filter press according to claim 8, wherein the pressing surface of the dehydrating shoe includes drainage holes over which the upper and lower filter belts are together guided.

12. A filter press according to claim 8, wherein the curved surface section extends over a substantial portion of the pressing surface of the dehydrating shoe.

13. A filter press according to claim 8, wherein the curved surface section is disposed on a stationary dehydrating shoe.

14. A filter press according to claim 8, further including:

means for laterally sealing the upper and lower filter belts, extending along edges of the upper and lower filter belts and defining a marginal zone at contact points with the edges, said means including:

an elongated sealing strip having an inner end and an outer end;

a pivotal support for pivotally mounting the inner end of the elongated sealing strip to the press;

the outer end of the strip extending along the edges of the upper and lower filter belts and defining a marginal zone at points of contact; and means for applying variable pressure to the means for laterally sealing at the marginal zone;

the means for applying variable pressure adjusting a height of the outer end of the elongated sealing strip, and the marginal zone of the lower filter belt and the marginal zone of the upper filter belt are pressed against each other, forming a tapering nip between the filter belts.

15. A filter press according to claim 14, wherein the means for applying variable pressure includes an inflatable tube, disposed beneath the outer end of the sealing strip, for pivoting the outer end of the sealing strip upon inflation, thereby varying the pressure exerted.

16. A filter press according to claim 14, wherein a chosen one of the upper and lower filter plates includes a surface defining a groove in a lateral direction, the surface facing away from the chosen filter belt;

the inflatable tube being disposed in the groove.

17. A filter belt press for separating solid matter from material suspensions, comprising:

an upper roller-guided filter belt including a substantially horizontally arranged part;

a lower roller-guided filter belt including a substantially horizontally arranged part;

means for moving the upper and lower filter belts in a chosen direction;

the substantially horizontally arranged part of the upper filter belt and the substantially horizontally arranged part of the lower filter belt defining therebetween a wedge-shaped space converging in a moving direction of the belts, a widest portion of the wedge-shaped space being adjacent a material-introducing side of the press, and a narrowest portion of the wedge-shaped space being adjacent a material-exiting side of the press;

an upper filter plate arranged above the upper belt, for guiding and supporting the upper belt over at least a portion of the substantially horizontally arranged part of the upper belt;

a lower filter plate arranged below the lower belt, for guiding and supporting the lower belt over at least a portion of the substantially horizontally arranged part of the lower belt;

a first dehydrating zone, including the upper filter belt, the lower filter belt, the wedge-shaped space, the upper filter plate and the lower filter plate, the first dehydrating zone defining a horizontal plane;

a second dehydrating zone, disposed in the moving direction immediately following the first dehydrating zone on substantially the same horizontal plane, including:

a first plurality of successively situated rollers having contact surfaces and axes parallel to and above the upper filter belt;

a second plurality of successively situated rollers having contact surfaces and axes parallel to and below the lower filter belt;

all said axes being disposed along an S-shaped line, and all said successively situated rollers abutting the upper and lower filter belts;

a beam, pivotally supported at an end thereof proximate and facing the narrowest portion of the wedge-shaped space;

a chosen plurality of the successively situated rollers mounted so as to face the upper and lower filter belts; and means for applying and adjusting contact force exerted by the beams upon the chosen plurality of rollers;

whereby the height of the chosen plurality of rollers is varied to place the contact surface of the chosen plurality of rollers on substantially a common level as the material-exiting side of the upper and lower filter plates.

18. A filter belt press according to claim 17, wherein the means for applying and adjusting presses the beam against the upper filter belt.

19. A filter belt press according to claim 17, further including means for laterally sealing the upper and lower filter belts, said means including:

an elongated sealing strip having an inner end and an outer end;

a pivotal support for pivotally mounting the inner end of the elongated sealing strip to the press;

the outer end of the strip extending along the edges of the upper and lower filter belts and defining a marginal zone at points of contact; and means for applying variable pressure to the means for laterally sealing at the marginal zone;

the means for applying variable pressure adjusting a height of the outer end of the elongated sealing strip, and the marginal zone of the lower filter belt and the marginal zone of the upper filter belt are pressed against each other, forming a tapering nip between the filter belts.

20. A filter belt press according to claim 19, wherein the means for applying variable pressure includes an inflatable tube, disposed beneath the outer end of the sealing strip, for pivoting the outer end of the sealing strip upon inflation, thereby varying the pressure exerted.

21. A filter belt press according to claim 19, wherein a chosen one of the upper and lower filter plates includes a surface defining a groove in a lateral direction, the surface facing away from the chosen filter belt;

the inflatable tube being disposed in the groove.

22. A filter belt press for separating solid matter from material suspensions, comprising:

an upper roller-guided filter belt including a substantially horizontally arranged part;

a lower roller-guided filter belt including a substantially horizontally arranged part;

means for moving the upper and lower filter belts in a chosen direction;

the substantially horizontally arranged part of the upper filter belt and the substantially horizontally arranged part of the lower filter belt defining therebetween a wedge-shaped space converging in a moving direction of the belts, a widest portion of the wedge-shaped space being adjacent a material-introducing side of the press, and a narrowest portion of the wedge-shaped space being adjacent a material-exiting side of the press;

an upper filter plate arranged above the upper belt, for guiding and supporting the upper belt over at least a portion of the substantially horizontally arranged part of the upper belt;

a lower filter plate arranged below the lower belt, for guiding and supporting the lower belt over at least a portion of the substantially horizontally arranged part of the lower belt;

a first dehydrating zone, including the upper filter belt, the lower filter belt, the wedge-shaped space, the upper filter plate and the lower filter plate, the first dehydrating zone defining a horizontal plane;

a second dehydrating zone, disposed in the moving direction immediately following the first dehydrating zone on substantially the same horizontal plane, including:

a pivotally supported dehydrating box defined by a perforated pressing surface, a head proximate the narrowest portion of the wedge-spaced shape, and a box end adjacent the material-exiting side of the press;

a pivotal support for pivotally mounting the box head to the press;

pressure adjustment means for pressing the box end against the upper and lower filter belts; and means for applying and varying the force between the pressing surface and the upper and lower filter belts;

whereby the pressing surface is situated on substantially a common level as the material-exiting side of the upper and lower filter plates and produces a controlled variable force against material present between the upper and lower filter belts.

23. A filter press according to claim 22, wherein the pressure adjustment means presses the dehydrating box against the upper filter belt.

24. A filter press according to claim 22, wherein the dehydrating box includes a surface defining distributed drainage holes.

25. A filter press according to claim 22, further including:

means for laterally sealing the upper and lower filter belts, said means including:

an elongated sealing strip having an inner end and an outer end;

a pivotal support for pivotally mounting the inner end of the elongated sealing strip to the press;

the outer end of the strip extending along the edges of the upper and lower filter belts and defining a marginal zone at points of contact; and means for applying variable pressure to the means for laterally sealing at the marginal zone;

the means for applying variable pressure adjusting a height of the outer end of the elongated sealing strip, and the marginal zone of the lower filter belt and the marginal zone of the upper filter belt are pressed against each other, forming a tapering nip between the filter belts.

26. A filter belt press according to claim 25, wherein the means for applying variable pressure includes an inflatable tube, disposed beneath the outer end of the sealing strip, for pivoting the outer end of the sealing strip upon inflation, thereby varying the pressure exerted.

27. A filter belt press according to claim 26, wherein a chosen one of the upper and lower filter plates includes a surface defining a groove in a lateral direction, the surface facing away from the chosen filter belt;

the inflatable tube being disposed in the groove.

28. A filter belt press for separating solid matter from material suspensions, comprising:

an upper filter belt and a lower filter belt, said filter belts being guided by rollers, each belt including substantially horizontally arranged parts;

an upper filter plate arranged above and guiding and supporting said upper belt, and a lower filter plate arranged below and guiding and supporting said lower belt, each said plate supporting said belt at least over one portion of said substantially horizontally arranged port of each belt;

said substantially horizontally arranged part of said upper filter belt and of said lower filter belt defining a wedge-shaped space converging in the moving direction of said belts and located therebetween, a widest portion of said wedge-shaped space being adjacent a material-introducing side of the press, and a narrowest portion of said wedge-shaped space being adjacent a material-exiting side of the press;

a first dehydrating zone and a second dehydrating zone;

said first dehydrating zone comprising said wedge-shaped space, said upper filter belt, said lower filter belt, said upper filter plate and said lower filter plate;

said second dehydrating zone, immediately following said first dehydrating zone in the moving direction on substantially the same horizontal plane, comprising one dehydrating shoe, said shoe with a head proximate said material-introducing side at the end or said narrowest portion of said wedge-shaped space and with an end adjacent said material-exiting side, a pivotal support for said shoe, said support being adjustable, said shoe being supported by said pivotal adjustable support, said shoe with a pressing surface including a convexly curved surface section disposed proximate the material-exiting side, facing and together guiding said two filter belts, pressure or adjusting means adapted to press said curved surface of said shoe against said two filter belts, and means for applying and varying a force between said pressing surface and said belts;

whereby said pressing surface is situated on substantially the same level as said material-exiting side of said press and includes means for producing a continuously rising force against the exiting material present between said upper filter belt and said lower filter belt.

29. The filter belt press according to claim 28, wherein said pressure or adjusting means are adapted to press said shoe against said upper filter belt.

30. The filter belt press according to claim 28, wherein said dehydrating shoe includes a pressure surface with drainage holes over which said two filter belts together are guided.

31. The filter belt press according to claim 28, wherein said curved surface section extends over at least a great portion of said pressing surface of said dehydrating shoe.

32. A filter belt press for separating solid matter from material suspensions comprising:

an upper filter belt and a lower filter belt, said belts being guided by rollers, each belt including substantially horizontally arranged parts:

an upper filter plate arranged above and guiding and supporting said upper belt, and a lower filter plate arranged below and guiding and supporting said lower belt, each said plate supporting said belt at least over one portion of said substantially horizontally arranged part of each belt;

said substantially horizontally arranged part of said upper filter belt and said lower filter belt defining a wedge-shaped space converging in the moving direction of said belts and located therebetween, a widest portion of said wedge-shaped space being adjacent a material-introducing side of the press, and a narrowest portion of said wedge-shaped space being adjacent a material-exiting side of the press;

a first dehydrating zone and a second dehydrating zone;

said first dehydrating zone comprising said wedge-shaped space, said upper filter belt, said lower filter belt, said upper filter plate and said lower filter plate;

said second dehydrating zone, immediately following said first dehydrating zone in the moving direction on substantially the same horizontal plane, comprising one dehydrating shoe, said shoe with a head located proximate said material-introducing side at the end of said narrowest portion of said wedge-shaped space and with an end adjacent said material-exiting side, a pivotal support for said shoe, said support being adjustable, said shoe being supported by said pivotal adjustable support and said shoe with a pressing surface including a convexly curved surface section proximate the material-exiting side facing and together guiding said two filter belts, pressure or adjusting means adapted to press said curved surface of said shoe against one of said two filter belts, and means for applying and varying the force between said pressing surface and said belts;

whereby said pressing surface is situated on substantially the same level as said material-exiting side of said press and includes means for producing a continuously rising force against the exiting material present between said upper filter belt and said lower filter belt;

means for the lateral sealing of said upper filter belt and said lower filter belt, including an elongated sealing strip, a pivotal support on said press for said sealing strip, said strip having an inner end pivotally mounted to said support on the press and an outer end, extending along said edges of said upper filter belt and lower filter belt and defining a marginal zone at the points of contact; and means for applying a variable pressure to said means for sealing at said marginal zone;

whereby said outer end of said elongated sealing strip is adjustable in height by said means for applying pressure, and said marginal zone of said upper filter belt and said marginal zone of said lower filter belt are pressed against each other, a tapering nip being formed between said upper filter belt and said lower filter belt.

33. The filter belt press according to claim 32, wherein said means for applying pressure includes an inflatable tube disposed beneath said outer end of said sealing strip, for pivoting said outer end of said elongated sealing strip upon inflation, thereby varying the pressure exerted.

34. The filter belt press according to claim 32, wherein a chosen one of said filter plates has a groove in a lateral direction on a surface facing away from said upper filter belt or lower filter belt, said inflatable tube being disposed in said groove.

35. A filter belt press for separating solid matter from material suspensions comprising:

an upper filter belt and a lower filter belt, said filter belts being guided by rollers, each belt including substantially horizontally arranged parts;

an upper filter plate arranged above and guiding and supporting said upper belt, and a lower filter plate arranged below and guiding and supporting said lower belt, each said plate supporting said belt at least over one portion of said substantially horizontally arranged part of each belt;

said substantially horizontally arranged part of said upper filter belt and of said lower filter belt defining a wedge-shaped space converging in the moving direction of said belts and located therebetween, a widest portion of said wedge-shaped space being adjacent a material-introducing side of the press, and a narrowest portion of said wedge-shaped space being adjacent a material-exiting side of the press;

a first dehydrating zone and a second dehydrating zone;

said first dehydrating zone comprising said wedge-shaped space, said upper filter belt, said lower filter belt, said upper filter plate and said lower filter plate;

said second dehydrating zone immediately following said first dehydrating zone in the moving direction on substantially the same horizontal plane, comprising one dehydrating shoe, said shoe with a head proximate said material-introducing side at the end or said narrowest portion of said wedge-shaped space and with an end adjacent said material-exiting side, said shoe with a pressing surface including a convexly curved surface section disposed proximate the material-exiting side, facing and together guiding said two filter belts, whereby said pressing surface is situated on substantially the same level as said material-exiting side of said press and includes means for producing a continuously rising force against the exiting material present between said upper filter belt and said lower filter belt and with means for a displacement of the guiding rollers for the belts, being adapted to vary the tension of the filter belts and thus of the pressure of the dehydrating shoe or its curved surface on the material to be dehydrated.

36. The filter belt press according to claim 35, wherein pressure or adjusting means are adapted to press said curved surface of said shoe against said two filter belts at once.

37. The filter belt press according to claim 35, wherein pressure or adjusting means are adapted to press said shoe against said upper filter belt.

38. The filter belt press according to claim 35, wherein said dehydrating shoe includes a pressure surface with drainage holes over which said two filter belts together are guided.

39. The filter belt press according to claim 35, wherein said curved surface section extends over at least a great portion of said pressing surface of said dehydrating shoe.

40. The filter belt press according to claim 35, wherein said curved surface pressure section is disposed on a stationary dehydrating shoe.

41. The filter belt press according to claim 35, comprising means for the lateral sealing of said upper filter belt and said lower filter belt, including an elongated sealing strip, a pivotal support on said press for said sealing strip, said strip having an inner end pivotally mounted to said support on the press and an outer end, extending along said edges of said upper filter belt and lower filter belt and defining a marginal zone at the points of contact; and means for applying a variable pressure to said means for sealing at said marginal zone;

whereby said outer end of said elongated sealing strip is adjustable in height by said means for applying pressure, and said marginal zone of said upper filter belt and said marginal zone of said lower filter belt are pressed against each other, a tapering nip being formed between said upper filter belt and said lower filter belt.

42. The filter belt press according to claim 41, wherein said means for applying pressure includes an inflatable tube disposed beneath said outer end of said sealing strip, for pivoting said outer end of said elongated sealing strip upon inflation, thereby varying the pressure exerted.

43. The filter belt press according to claim 41, wherein a chosen one of said filter plates has a groove in a lateral direction on a surface facing away from said upper filter belt or lower filter belt, said inflatable tube being disposed in said groove.

44. A filter belt press for separating solid matter from material suspensions comprising:

an upper filter belt and a lower filter belt, said filter belts being guided by rollers, each belt including substantially horizontally arranged parts;

an upper filter plate arranged above and guiding and supporting said upper belt, and a lower filter plate arranged below and guiding and supporting said lower belt, each said plate supporting said belt at least over one portion of said substantially horizontally arranged parts of each belt;

said substantially horizontally arranged part of said upper filter belt and said lower filter belt defining a wedge-shaped space converging in the moving direction of said belts and located therebetween, a widest portion of said wedge-shaped space being adjacent a material-introducing side of the press, and a narrowest portion of said wedge-shaped space being adjacent a material-exiting side of the press;

a first dehydrating zone and a second dehydrating zone;

said first dehydrating zone comprising said wedge-shaped space, said upper filter belt, said lower filter belt, said lower filter belt, said upper filter plate and said lower filter plate;

said second dehydrating zone, situated immediately following said first dehydrating zone in the moving direction on substantially the same horizontal plane, comprising a first plurality of successively situated rollers having contact surfaces and axes parallel to and above said filter belt, and a second plurality of successively situated rollers having contact surfaces and axes parallel to and below said lower filter belt, all said axes and all said successively situated rollers being disposed along an S-shaped line said successively situated rollers abutting said upper filter belt and said lower filter belt, and further comprising a beam, a pivotal support for said beam, said beam with a head proximate said narrowest portion of said wedge-shaped space, and with an end adjacent the material-exiting side of the press, said beam being pivotally supported at its end proximate facing said narrowest portion of said wedge-shaped space, on which beam a chosen plurality of said successively situated rollers is mounted facing said belts, and means for applying and adjusting the contact force exerted by said beam upon said chosen plurality of rollers;

whereby the height of said chosen plurality of rollers is varied to place the contact surface of said chosen plurality of rollers on substantially the same level as the material-exiting side of said upper and lower filter plates.

45. The filter belt press according to claim 44, wherein said pressure or adjusting means are adapted to press said beam against said upper filter belt.

46. The filter belt press according to claim 44, comprising means for the lateral sealing of said upper filter belt and said lower filter belt, including an elongated sealing strip, a pivotal support on said press for said sealing strip, said strip having an inner end pivotally mounted to said support on the press and an outer end, extending along said edges of said upper filter belt and lower filter belt and defining a marginal zone at the points of contact; and means for applying a variable pressure to said means for sealing at said marginal zone;

whereby said outer end of said elongated sealing strip is adjustable in height by said means for applying pressure, and said marginal zone of said upper filter belt and said marginal zone of said lower filter belt are pressed against each other, a tapering nip being formed between said upper filter belt and said lower filter belt.

47. The filter belt press according to claim 46, wherein said means for applying pressure includes an inflatable tube disposed beneath said outer end of said sealing strip, for pivoting said outer end of said elongated sealing strip upon inflation, thereby varying the pressure exerted.

48. The filter belt press according to claim 46, wherein a chosen one of said filter plates has a groove in a lateral direction on a surface facing away from said upper filter belt or lower filter belt, said inflatable tube being disposed in said groove.

49. A filter belt press for separating solid matter from material suspensions comprising:

an upper filter belt and a lower filter belt, said filter belts being guided by rollers, each belt including substantially horizontally arranged parts;

an upper filter plate arranged above and guiding and supporting said upper belt, and a lower filter plate arranged below and guiding and supporting said lower belt, each said plate supporting said belt at least over one portion of said substantially horizontally arranged part of each belt;

said substantially horizontally arranged part of said upper filter belt and said lower filter belt defining a wedge-shaped space converging in the moving direction of said belts and located therebetween, a widest portion of said wedge-shaped space being adjacent a material-introducing side of the press, and a narrowest portion of said wedge-shaped space being adjacent a material-exiting side of the press;

a first dehydrating zone and a second dehydrating zone;

said first dehydrating zone comprising said wedge-shaped space, said upper filter belt, said lower filter belt, said upper filter plate and said lower filter plate;

said second dehydrating zone, immediately following said first dehydrating zone in the moving direction on substantially the same horizontal plane, comprising a dehydrating box, said box with a head and an end, said head being arranged proximate said narrowest portion of said wedge-shaped space, a pivotal support for said box, said head of said box being supported by said pivotal support, said box being defined by a perforated pressing surface, said end being arranged at the material-exiting side of the press, pressure or adjusting means adapted to press said end against said belts, and means for applying and varying the force between said pressing surface and said belts;

whereby said pressing surface is situated on substantially the same level as the material-exiting side of said upper and lower filter plates and produces a controlled variable force against the material present between said upper filter belt and said lower filter belt.

50. The filter belt press according to claim 49, wherein said pressure and adjusting means are adapted to press said box against said upper filter belt.

51. The filter belt press according to claim 49, wherein said dehydrating box includes a surface defining a distribution on drainage holes.

52. The filter belt press according to claim 49, comprising means for lateral sealing of said upper filter belt and said lower filter belt, including an elongated sealing strip, a pivotal support on said press for said sealing strip, said strip having an inner end pivotally mounted to said support on the press and an outer end, extending along said edges of said upper filter belt and lower filter belt and defining a marginal zone at the points of contact; and means for applying a variable pressure to said means for sealing at said marginal zone;

whereby said outer end of said elongated sealing strip is adjustable in height by said means for applying pressure, and said marginal zone of said upper filter belt and said marginal zone of said lower filter belt are pressed against each other, a tapering nip being formed between said upper filter belt and said lower filter belt.

53. The filter belt press according to claim 52, wherein said means for applying pressure includes an inflatable tube disposed beneath said outer end of said sealing strip, for pivoting said outer end of said elongated sealing strip upon inflation, thereby varying the pressure exerted.

54. The filter belt press according to claim 52, wherein a chosen one of said filter plates has a groove in a lateral direction on a surface facing away from said upper filter belt or lower filter belt, said inflatable tube being disposed in said groove.

* * * * *